July 20, 1926.
T. ROBINSON
1,593,397
PROCESS AND APPARATUS FOR ELECTRODEPOSITION
Filed August 5, 1924 6 Sheets-Sheet 1
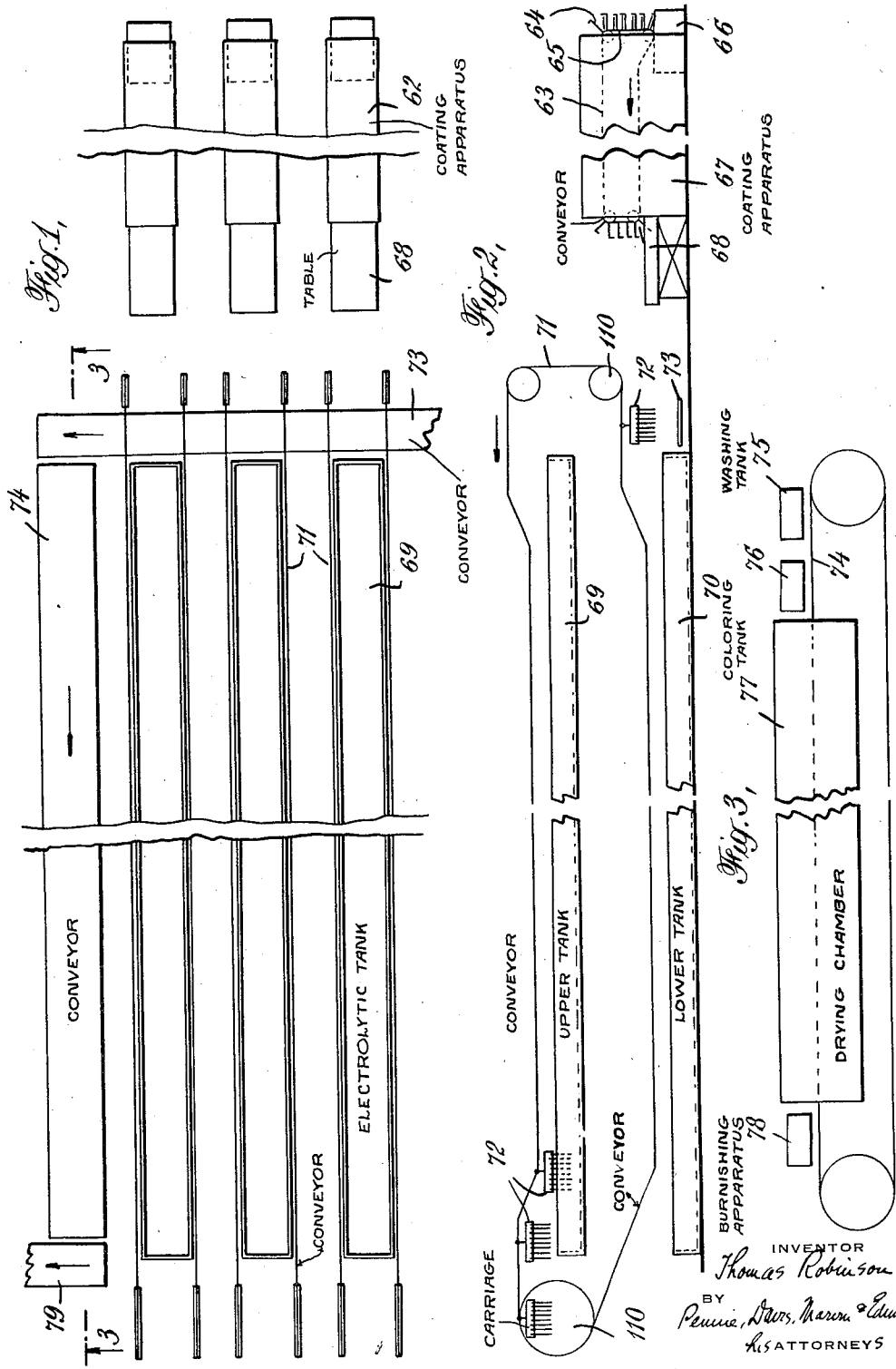

July 20, 1926.
T. ROBINSON
1,593,397
PROCESS AND APPARATUS FOR ELECTRODEPOSITION
Filed August 5, 1924 6 Sheets-Sheet 2
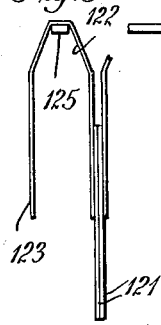
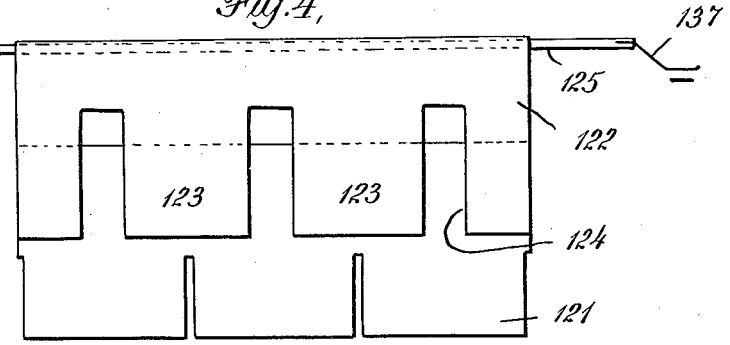
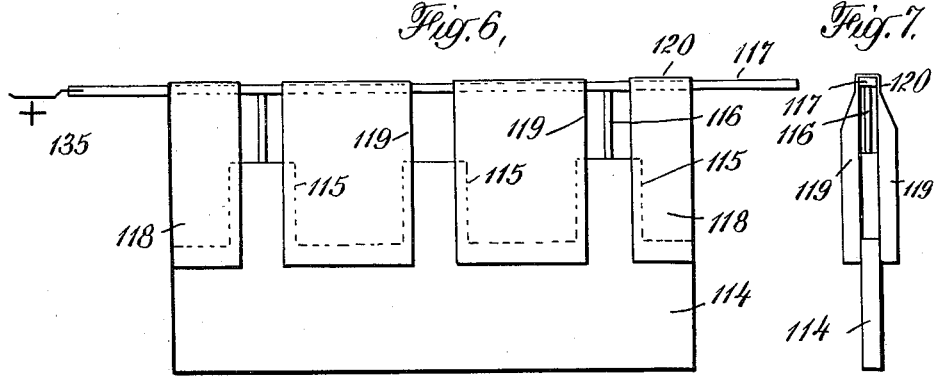
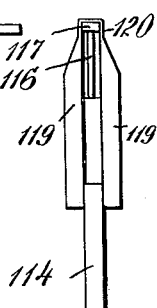
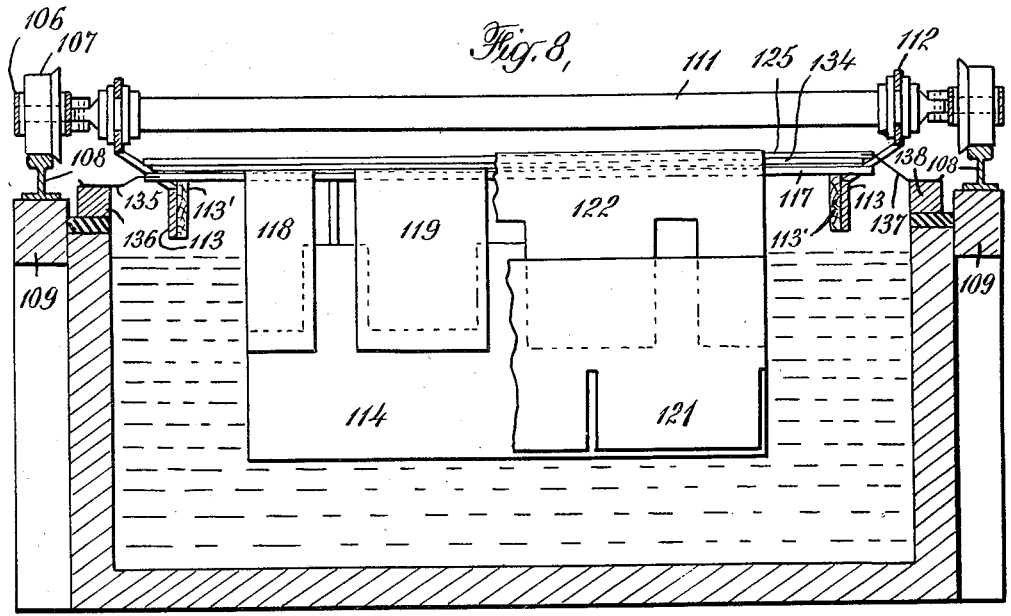

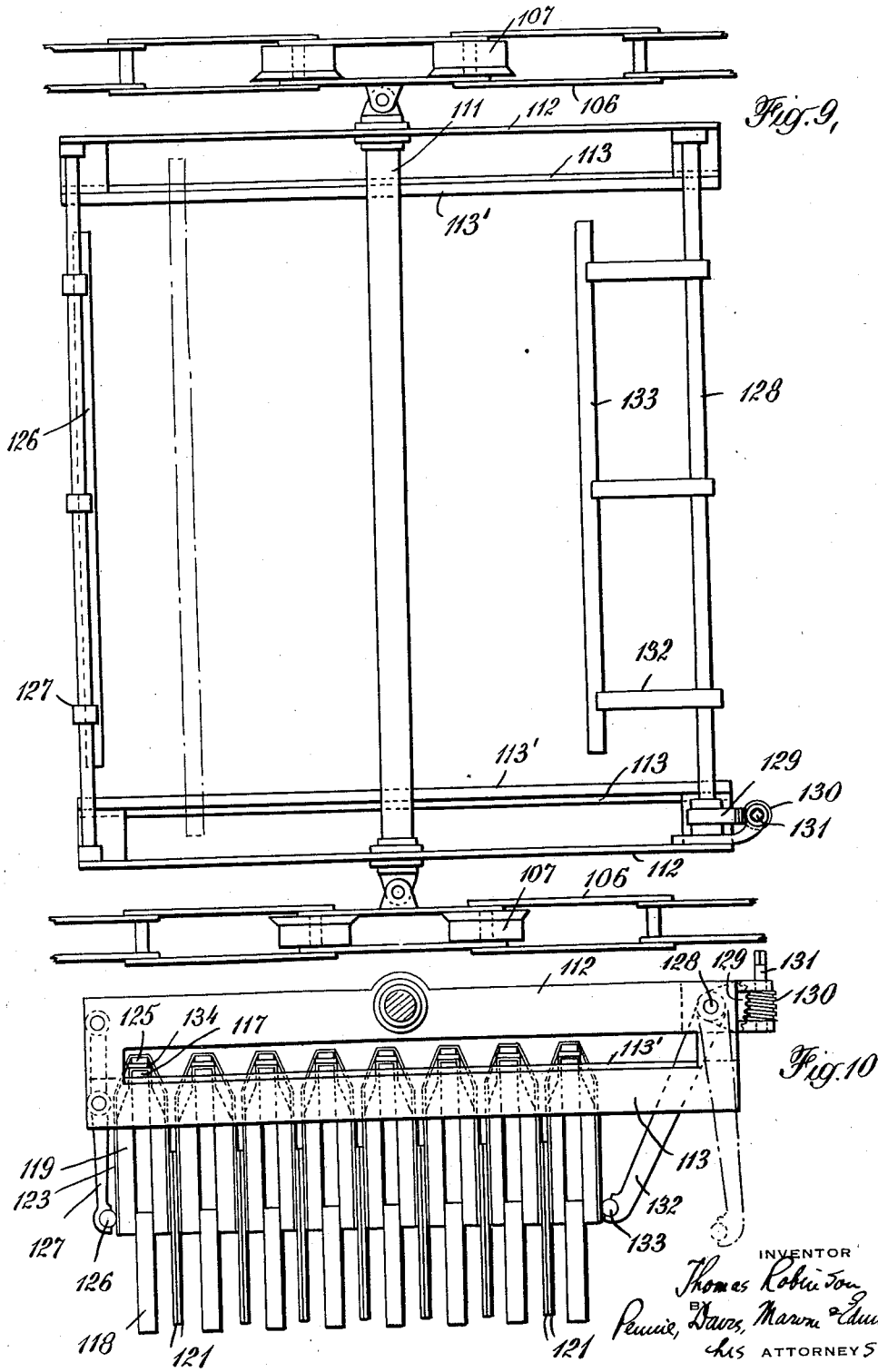

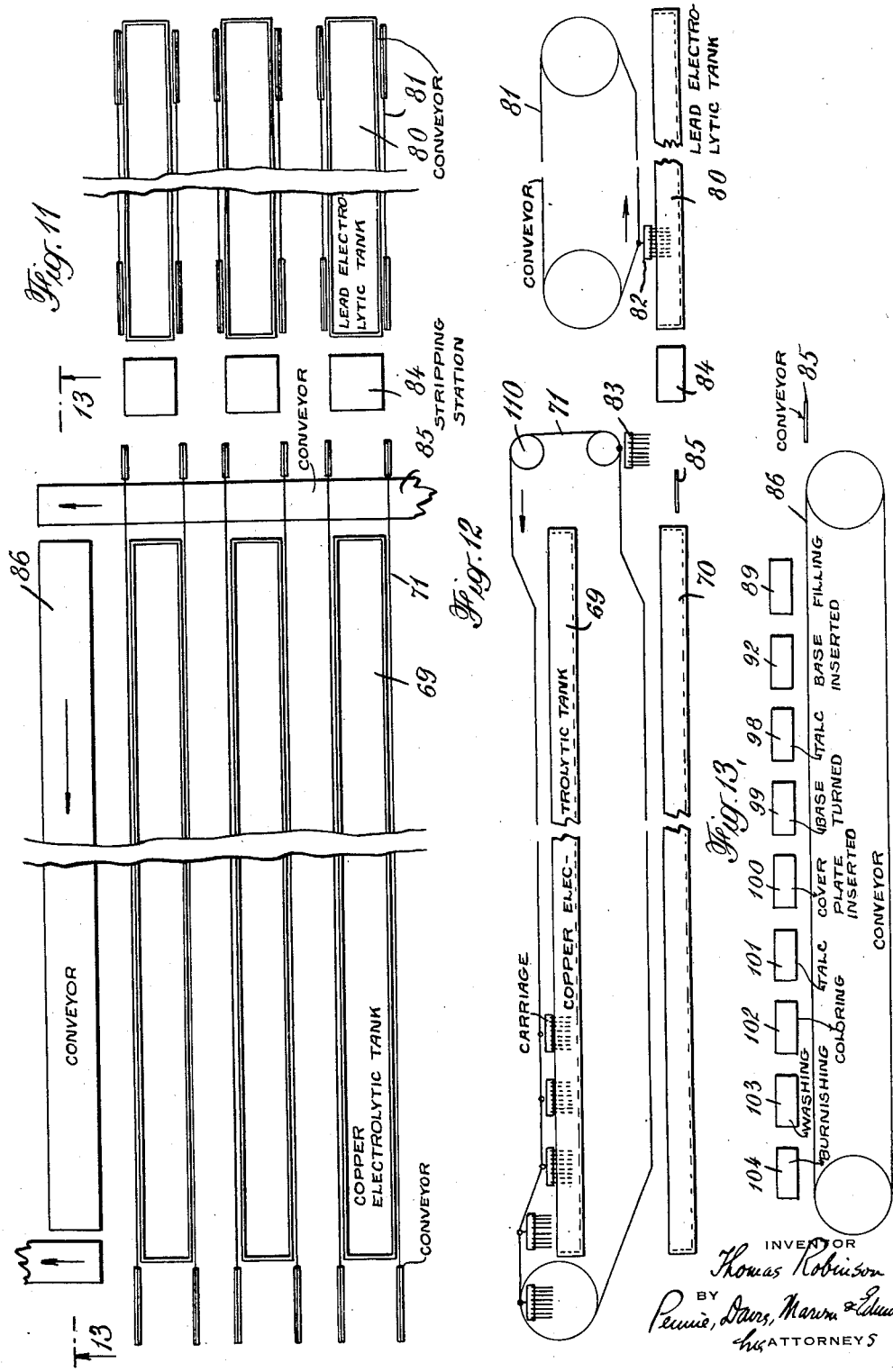

July 20, 1926. 1,593,397
T. ROBINSON
PROCESS AND APPARATUS FOR ELECTRODEPOSITION
Filed August 5. 1924 6 Sheets-Sheet 5
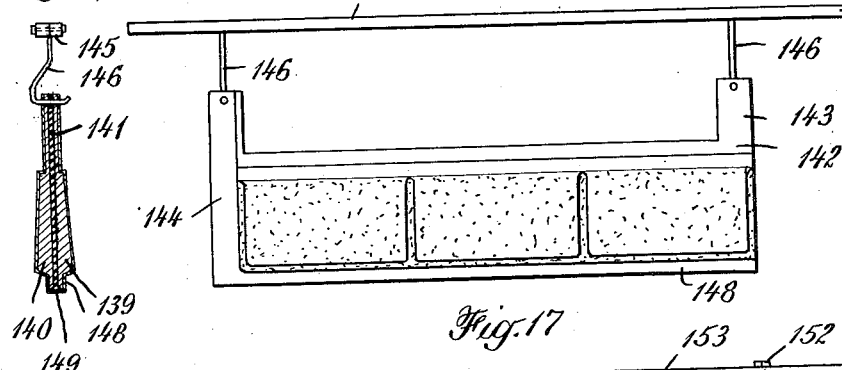
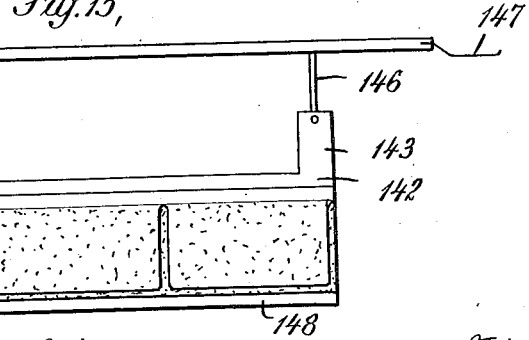
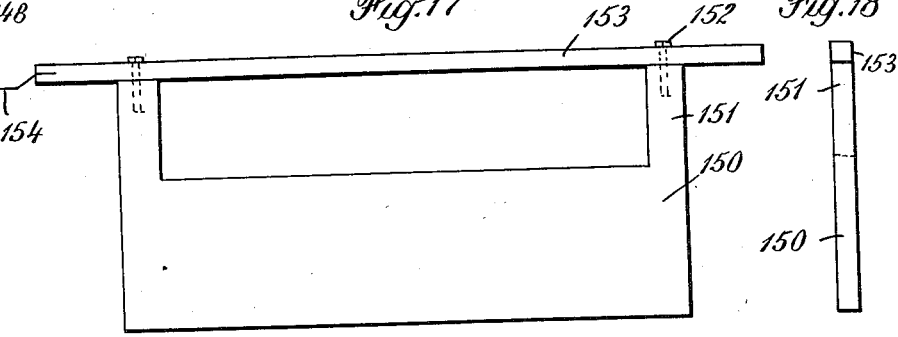
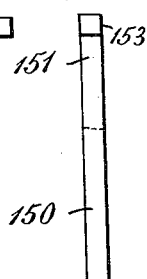
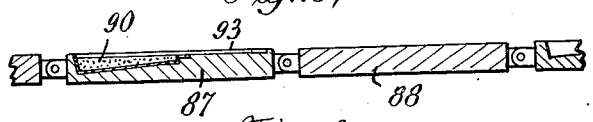
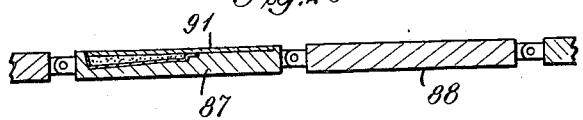
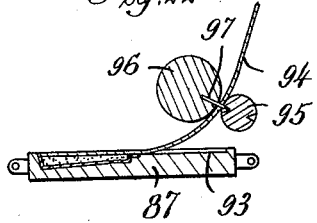
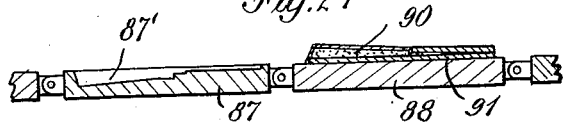
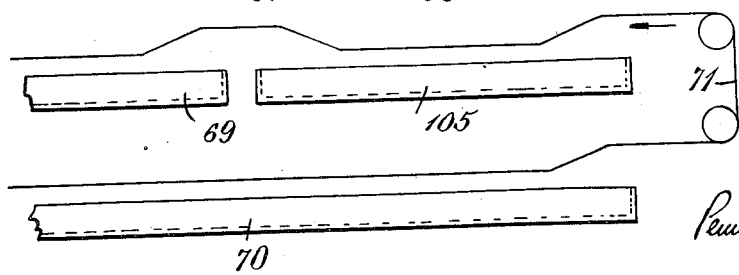

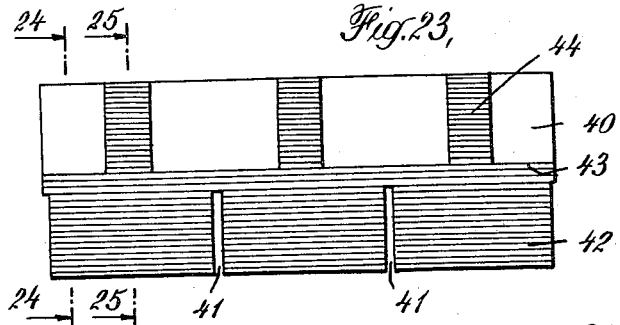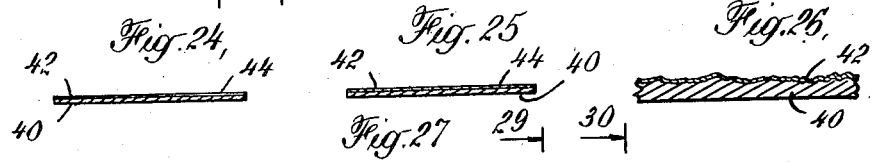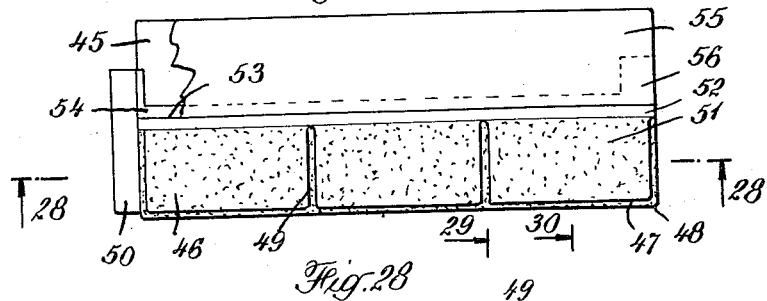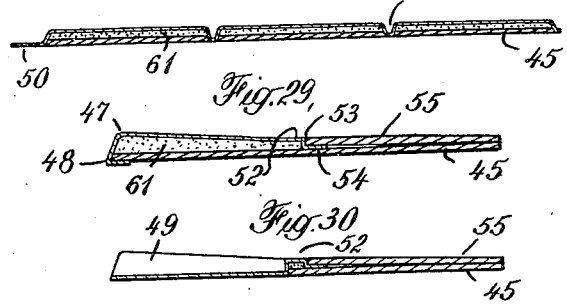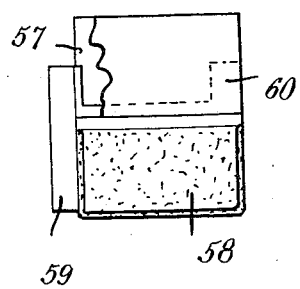

Patented July 20, 1926.

1,593,397

UNITED STATES PATENT OFFICE.

THOMAS ROBINSON, OF NEW YORK, N. Y., ASSIGNOR TO ANACONDA SALES COMPANY, OF NEW YORK, N. Y., A CORPORATION OF DELAWARE.

PROCESS AND APPARATUS FOR ELECTRODEPOSITION.

Application filed August 5, 1924. Serial No. 730,171.

This invention relates to a process and apparatus for electrodeposition which is particularly useful for the electrolytic application of a plating upon a non-metallic surface, and also for the production of metallic articles by deposition on a cathode from which these articles are later stripped. The invention is of particular utility in the manufacture of articles of a uniform size in large quantities, especially when the plating or the article itself, as the case may be, is relatively thin. An example of such an article is a so-called composite roofing element consisting of a non-metallic composition base having one surface covered and protected by a layer of metal, and one adaptation of the invention to the manufacture of such roofing elements will presently be described, though it is to be understood that the invention is by no means limited to such use but is capable of many other applications.

The composite roofing materials above referred to fall into two general classes. One kind of element consists of a piece of base material cut to appropriate size and form, on which is applied a layer of conducting coating, such as graphite, over which is then deposited a protective layer of metal. The metal ordinarily employed for the purpose is copper because it does not corrode easily and has an attractive appearance, and consequently this element, which is most commonly made in the shape of a shingle, is referred to commercially as the copperclad shingle, and will be so designated in this application.

The other class of composite elements, for the production of which the present invention may be used with advantage, differs from the copperclad shingle in that the metallic protective layer is not produced in the form of a deposit applied directly to the base, but the protective sheathing is preformed, as, for instance, by rolling, stamping, or by electrodeposition. It is this last process of manufacture for which the present invention is particularly adapted. The sheathing which is applied to each base is in the form of a somewhat concave shell, and these shells are produced by deposition of the metal upon a cathode of appropriate form, from which the metal is later stripped off when the deposit has attained the desired thickness. These shells are then laid with their concavities uppermost, and a quantity of a plastic material which will harden on cooling, is placed in the heated condition in the concavity and then the base put in position. Ordinarily, the shell will only cover one end of the base. The base and shell are then held in their proper relation until the plastic compound has hardened sufficiently to set, whereupon the base and shell, now affixed together, are given the final treatments to put the element in desired condition for commercial distribution. This element, known as the shell type, may be made in various forms, but for convenience its manufacture in the form of a shingle will be set forth in detail.

Both the copperclad and the shell type shingles offer numerous advantages over the roofing materials which have previously been used in substitution for wood. These materials sometimes consist merely of a composition base of felt cut to appropriate size and shape, but such composition roofings deteriorate when exposed to the weather, by reason of the volatilization of the lighter oils which are used in the production of the composition product. This frequently results in warping or curling, which not only gives the roof an unsightly appearance, but may also cause gaps sufficient to permit rain and wind to enter. These composition roofings are cheaper than wood shingles, and are more nearly fireproof. For this reason they are extensively used, but they have some objectional features, as, for example, their monotonous appearance. All-metal shingles have also been widely used, but these involve the disadvantage of being quite costly and, furthermore, it is difficult to lay such materials on a roof in such a way as to produce tight joints. All-metal shingles are attractive in appearance and have a long life, especially when made of a non-corrodible metal, like copper, but they conduct heat rapidly and a satisfactory roof must include additional sheathing layers which acts as an insulator against the transmission of heat.

The composite type consisting of a base and a layer of metal affixed to that surface of the base which is exposed to the weather when the roofing elements are laid in the usual way, combines the advantages of both of these shingles, since all exposed portions of the roof are protected by metal, as in the case of all-metal shingles, and by reason of the small quantities of metal which are used, and because of the ease in making water-tight joints without soldering or other operations of that character, the cost of a roofing of these composite elements is comparatively low. The base itself provides the mechanical strength required, and the metallic layer serves simply to protect the base and enhance its appearance, adding little, if any, mechanical strength, although, as will presently be seen, the use of the shell to a certain extent assists in preventing warping or curling at the edges.

The present invention, as has been stated, is capable of adaptation in the production of either the copperclad or shell types of element, and it involves the provision of suitable electrolytic apparatus by which the protective coating may be applied, either directly on the bases, or on a cathode blank from which it is later stripped for use in making the shell elements. The process and the apparatus by which it is practiced are designed so that the manufacture may be carried on in a practically continuous manner, without substantial delay, and with a minimum occupancy of floor space. Generally speaking, the process for the production of copperclad shingles involves the steps of coating the bases with an adhesive, applying a conducting coating thereto, moving these elements with a plurality of anodes in a group through an electrolytic cell containing the electrolyte, this movement continuing until the deposit has been built up to the desired thickness, and then removing the plated bases and washing, coloring, and performing the other steps necessary to give the elements the appearance desirable for commercial distribution. In the production of the shell elements the process involves moving a group of cathodes and anodes through an electrolytic cell in which a thin film of metal is plated upon the cathodes. This is a preliminary step, and this treatment is for the purpose of facilitating the removal of the shells from the cathodes, the metal deposited in this preliminary treatment being lead. A group of lead-plated cathode blanks, together with a group of anodes of the metal of which the shells are to be made, are then passed through an electrolytic cell in which the deposition of the shells upon the cathodes takes place. After passage through this electrolytic cell, the cathode blanks, with the deposits upon them, are removed and the shells stripped therefrom. The stripped shells are now ready for the insertion of the bases, and this may be done by placing a quantity of adhesive plastic material in the shells, and then pressing the bases in position. For production at high speed, it is preferable to place the shells in motion and while they are so moving introduce the plastic adhesive compound and then insert the bases. Various other incidental steps are also performed, such as trimming the shells, burnishing the metal, applying talc to prevent the elements from sticking together, together with numerous other operations of that nature. In each case, however, the process is so carried on that the bases or cathode blanks are given the electrolytic treatment while in motion and the plated bases or the shells, while continuing in motion without considerable interruption, are carried forward to various stations where the other operations necessary for the production of the final material are carried on.

In the accompanying drawings there is illustrated, largely in diagrammatic form, that embodiment of the invention which is now preferred, and in these drawings:—

Fig. 1 shows a plan view of the plant layout used for the production of copperclad shingles, Fig. 2 is a side elevation of the same, Fig. 3 is a view in side elevation showing a layout of apparatus used in the finishing treatment, Fig. 4 is a face view showing a separator used in the electrodeposition as placed relative to a base, Fig. 5 is an end view of the assembly shown in Fig. 4, Figs. 6 and 7 are side and end views respectively of an anode, showing the separators in place thereon, Fig. 8 is a cross-sectional view of a cell, showing a portion of the conveyor and a carriage or frame with the anode assembly and the base in position relative thereto, Fig. 9 is a plan view of the assembly shown in Fig. 8, Fig. 10 is an end elevation of the same, Fig. 11 is a plan view showing a layout of apparatus used for the production of the shell type of element, Fig. 12 is a view in side elevation of the same, Fig. 13 is a view of the finishing conveyor, showing diagrammatically the different operations performed on the elements moving along on this conveyor, Fig. 14 is a diagrammatic view of a modified form of apparatus in which a single conveyor is used instead of the two conveyors shown in Fig. 12, Fig. 15 is a face view of a cathode blank, such as is used in the manufacture of the shells, Fig. 16 is an end view of the same, Figs. 17 and 18 are side and end views, respectively, of an anode used in this process, Fig. 19 is a cross-sectional view of the finishing conveyor, showing how the conveyor bars are formed, Fig. 20 is a view similar to Fig. 19, but showing one of the elements in place therein, Fig. 21 is a view similar to Fig. 20, but showing a later step in the process of finishing shells, Fig. 22 illustrates diagrammatically a method of inserting the bases in the shells, Fig. 23 is a face view of a three-unit multiple copperclad shingle, Figs. 24 and 25 are views taken on the lines 24—24 and 25—25 of Fig. 23, Fig. 26 is a cross-sectional view on an enlarged scale showing the interlock between the base and the metallic layer, Fig. 27 is a face view of the shell type of shingle with parts broken away, Figs. 28, 29, and 30 are cross-sectional views taken respectively on the lines 28—28, 29—29, and 30—30, of Fig. 27, Fig. 31 is a view showing a single unit shell type shingle, Fig. 32 is a cross-sectional view of a detail taken on a large scale.

For a clearer understanding of the invention, reference will first be made to the two types of elements illustrated in Figs. 23 to 32, inclusive. The element shown in Fig. 23 is of the copperclad type, and is of the three-unit size. This element is made of a base 40, which is made of a composite material of various well-known types, such for instance, as so-called asphalt roofing felt, which is made of paper, rags, burlap, and the like, impregnated with asphaltic or bituminous compounds. Other materials may be used, such as ground cork or asbestos impregnated and held together by suitable binding materials. The kind of base which is used in these elements is, to a large extent, determined by the quality of the product which is to be produced, and numerous materials are employed. These materials may be generally referred to as non-metallic, plastic compositions, resistant to water.

The base shown in Fig. 23 is of the three-unit size and it has a width which corresponds to the length of an ordinary wood shingle, and a length which is substantially equivalent to the length of three such shingles laid side by side in the usual spaced relation. Elements of this type are secured to the roof in overlapping courses, as is customary with wooden shingles, and cut-outs 41 are formed in their forward edges so that when the element is laid it will more closely simulate the appearance of separate shingles. In order to protect the base from the weather, a sheathing layer 42 of metal is applied to that surface of the base which is normally exposed and which may be designated as the weather surface, and this metallic layer extends back a sufficient distance so that the elements of the course above will overlie its rear edge 43. It will be seen that the element in the rear course will expose portions of the elements beneath, through the cut-outs 41, and in order to protect this exposed portion of the elements, there are provided tongues 44, formed as extensions from the main metallic layer. When elements as shown in Fig. 23 are laid in the usual relation, it will be seen that all portions of the base exposed to the weather are protected by the metal and a non-corrodible metal is employed so as to give the maximum life. Copper is preferably used for the purpose on account of the ease with which it may be handled electrolytically, its comparative cheapness, and its attractive appearance. Preferably the surface of the base is not smooth, but is roughened, as shown in Fig. 26, so that when the metallic layer 42 is applied thereto this layer conforms to the surface irregularities and what amounts to a mechanical interlock is provided. The desired roughness or irregularity of the base surface may be secured by making use of a base which has granular material partially embedded in its surface. Roofing materials having surfaces in which granular mineral material is embedded, as for example, slate, are commonly used commercially. The roughening of the surface of the base achieves two other important results, first, in giving the metal a texture which improves its appearance, and second, in causing the expansion of the different parts of the base to take place in different directions such that the expansion of these various portions tend to counteract each other. If the metal were disposed in a plane, it might have a tendency to separate from the base on account of the greater rate of expansion of the metal than the base, but this condition is obviated by producing the surface irregularities, as described.

The shell type of element is illustrated in Figs. 27 to 32, inclusive, and the element illustrated in Fig. 27 is of the three-unit type. It consists of a base 45 of appropriate form, and a shell of metal 46 secured to one surface of the base. The base is made of any of the materials previously referred to, and the metal is preferably formed by electrodeposition on the cathode, from which it is stripped and then later applied to the base. This shell has concave portions 47, into which the end of the base projects, with splay edges 48, these edges serving to enclose the edges of the base and also to provide a considerable degree of stiffness along these edges, thus preventing warping or curling. In order to simulate the appearance of single shingles or tiles, the base has cut-out portions and the shell has depressed areas 49 which are received in these cut-outs. Thus the entire area over which the base lies at its forward edge is protected by metal. At one edge there may be an extending tab 50, preferably of metal and formed integrally with the shell, and this tab extends from a point near the front edge of the base to a point spaced forwardly of the rear edge. When a pair of elements are laid side by side the right-hand edge of one element overlies the tab extending from the left-hand edge of the other. This tab, as will be seen from Fig. 28, lies substantially in the plane of the rear surface of the element, and when a pair of elements are placed in this overlapping relation the space between them is protected by metal. Thus it is possible to make the size of the individual sections representing single shingles in varying dimensions, whereas in the case of the copperclad shingles the units must be made with relative uniformity, in order that the tongues of the elements in the course beneath will underlie the cut-outs. In the shell type of element, however, each course practically provides a continuous strip of metal from one end of the roof to the other, and the base is wholly protected without dependence on metal in the element of a different course.

The portion of the metal which is exposed in these elements and which forms the bottom of the concavity 51, is preferably of a roughened appearance, but to the rear there is a transverse extension 52 which is smooth. This extension may lie flush with the surface of the base, the concavity and extension merging with a gradual taper, or else the rear end of the extension may be provided with a vertical flange 53, with a further extension 54 projecting rearwardly from the bottom edge of the flange. When the extension 52 lies flush with the surface of the base, the element consists of three parts, the base, the layer of filling material, presently to be described, and the shell, whereas with the second type of the element the rear surface of the base is covered with a cover plate 55 which may either be a piece of material similar to that of which the base is formed, or may be a layer of a plastic compound similar to the filling material. The use of the additional cover layer has numerous advantages which need not be discussed. Extending rearwardly from the extension 52 at one edge thereof, is a tab 56 which lies along one edge of the base, and this tab provides a means for securing the element in place on the roof by a nail which passes through the tab and the base.

In Fig. 31 there is illustrated a single shingle element in which the base 57 corresponds in size and shape to an ordinary wooden shingle, and the shell 58 is also of appropriate size to cover the forward edge of this base. This element also has the extending tabs 59 and 60, similar to the tabs 50 and 56, previously referred to.

In manufacturing these elements the base is made in appropriate size by well-known methods, and the shell is preferably made by electrolytic deposition upon a cathode blank of appropriate form. These shells are stripped from the cathode, are laid with their concavities uppermost, and a quantity of an adhesive plastic material 61 placed in the concavities. The plastic material which is used for the purpose may be a bituminous compound such as asphalt, or it may be a fibrous or granular material, such as asbestos, ground cork, and the like impregnated with an adhesive binding medium. Various other materials may also be employed for the purpose, but the filling material which is preferably used is one which may be designated as a plastic material of an adhesive character. The desired quantity of this adhesive material is placed in position in the concavity and the end of the base inserted therein. The two are then pressed or held together until the filler has set and then after the final steps are performed the element is ready for the market.

The copperclad element referred to is described and claimed in my Patent No. 1,449,058, and the shell type of element is described and claimed in my co-pending application, Ser. No. 722,452, filed June 26, 1924.

In the production of the copperclad element the apparatus illustrated in Fig. 1 is used. The layout there illustrated is such as would be used in commercial practice in which a plurality of electrolytic tanks are employed. The bases cut to the desired size are conveyed to the rear end of the apparatus, designated generally with the reference character 62. This apparatus is designed for the purpose of applying the conducting coating to the bases and a conveyor 63 is used which is in the form of a moving chain or other similar device having a plurality of arms 64, arranged to receive individual bases. The conveyor has a vertical stretch 65 at the rear end of the apparatus and the bases are placed one in each arm at this point. As the conveyor moves, the bases pass through a vat 66 in which an adhesive liquid is contained. This adhesive liquid is preferably in the form of an emulsion of asphalt and water and after leaving the vat the conveyor moves the bases through a drying chamber 67 in which the temperature is maintained at an appropriate value. The bases moving through the chamber, are dried to such an extent that the surface remains tacky, and as the conveyor passes out of the chamber at the forward end the bases are automatically dropped upon a table 68. Here the graphite or other conducting material is applied by a workman, and for this purpose he may dust the graphite on with a brush or by means of a blower. The bases are now ready to receive the deposit of metal.

The electrolytic tanks 69 are used in pairs, the lower tank being designated as 70 in Fig. 2. These tanks are of similar length and of a size determined by the size of the elements which are to be passed through them, and the length will be so determined that the conveyor may move the bases through the tanks at a convenient speed, and when both tanks have been traversed the bases will have a plating of the desired thickness formed upon them. It is clear that the rate of deposition will depend on the electrical conditions, but the rate of deposition, the length of the tanks, and the rate of movement of the bases through the tanks, will be determined so that the floor space in the plant may be used to the best advantage with the production of an element of the desired quality. Moving over the tanks is a conveyor 71 which will presently be described in more detail but this conveyor is preferably in the form of a pair of chains having cross bars from which are supported carriages or frames in which may be mounted a plurality of bases and anodes. As the bases are completed on the table 68, they are inserted in the carriage 72 along with a number of anodes. As this carriage is moved along by the conveyor in the direction indicated by the arrow, the carriage is moved downwardly toward the tank so that the anodes and bases are immersed in the electrolyte. Suitable electrical circuits are also established at this time so that deposition takes place upon the bases, while the anodes go into solution in the electrolyte. As the carriage approaches the rear end of the tank 69 it is lifted out by appropriate means, and then transferred to the lower tank 70, along which it moves in the reverse direction, to the starting point. At this point the bases now plated are removed from the carriage and placed upon a cross conveyor 73, while new bases are inserted in position. This step in the process may be carried on, as will presently be shown, without considerable delay, so that the movement of the conveyor is practically continuous.

In a convenient layout, such as is shown in Fig. 1, there are a plurality of pairs of upper and lower tanks, each of which has its individual conveyor, and each of which is provided with the apparatus by which the bases are given the conducting coating. The layout of the plant, however, will depend to a large extent on the amount and arrangement of the floor space available. The cross conveyor 73 delivers the plated elements to a conveyor 74, where the final steps in the process are carried on. The elements are first subjected to a washing operation, as indicated diagrammatically at 75 in Fig. 3, and this washing may be a dipping operation such that any traces of the electrolyte which cling to the bases are removed. Passing from the washing vat, the elements are subjected to a coloring treatment to produce color effects in the metal. If copper is employed this coloring may be carried on, for instance, by spraying with a solution of salammoniac, which produces green tints in the copper. Other coloring operations appropriate for the purpose will be substituted for this treatment, as may be desired. From the coloring station 76, the bases are passed through a drying chamber 77 to dry the last traces of the coloring liquid, and from the coloring chamber the bases are passed to a burnishing station 78, where the metal is appropriately treated to give it the finished appearance. From the burnishing station the elements pass to a final conveyor 79, by which they are conveyed to storage warehouses or to places where they may be prepared for shipment.

It will be seen that with the arrangement illustrated, the production of the elements is carried on while they are in motion, and the electrolytic deposition of the metal takes place without any considerable delay and in a practically continuous manner. While there has been shown a graphiting apparatus for each of the pairs of electrolytic cells, it is possible that a single graphiting apparatus of a proper size may be sufficient for supplying coated bases for a group of tanks, in which event the graphiting apparatus will be placed in any convenient location with reference to these tanks. Preferably, the anodes which are used will be of the same metal as that which is to be deposited, although insoluble anodes may be used and the strength of the electrolyte maintained from time to time by withdrawing exhausted electrolyte and placing new electrolyte in the cells. The conditions under which the electrodeposition is carried on will depend on the power available and on various other factors well-known in the art. The conditions in the cell will be chosen with reference to the power, equipment, the desired rate of production, and the like.

In Figs. 11, 12, 13 and 14 there is illustrated a layout of apparatus appropriate for the production of the shells. In this case, as has previously been described, the metal is not deposited directly upon the bases, but is deposited on cathode blanks from which it is later stripped. The process described in my co-pending application, Ser. No. 722,699, filed June 27, 1924, has been found satisfactory for the purpose, and the present layout of the apparatus is designed to include the process described in that application. Referring to Fig. 12, for example, it will be seen that the graphiting apparatus is eliminated and in place of it there is employed an electrolytic tank 80 containing an electrolyte in which lead is in solution. A conveyor 81 is placed in convenient relation to this tank and travels in the direction indicated by the arrow. This conveyor may take the form of a pair of chains connected at intervals by cross bars, and suspended from these cross bars are carriages or frames in which a plurality of lead anodes may be mounted. The cathode blanks presently to be described, are placed in position between the anodes. The cathode blanks ordinarily consist of a mass of conducting metal, such as copper, shaped to appropriate form. For increasing the speed of production, each cathode blank is made in two halves, separated by an insulating layer so that two shells are simultaneously plated on each blank during the process. When the process is to be started a number of cathode blanks are placed in one of the frames 82 on the conveyor 81, and passed through the electrolyte in the cell 80. In mounting the blanks on the frame, appropriate electrical circuits are established so that current is introduced into the cell through the anodes and withdrawn through the blanks. In their movement through the cell the blanks receive a thin plating of lead and as they return to the front of the tank they are removed from the frame and unplated elements placed in position. This process is carried on continuously.

The cathodes so plated with lead are next placed in a frame 83 on the main conveyor 71, and copper anodes are now supported in the frame between adjacent cathodes. The frames are passed through the upper and lower tanks 69 and 70, as before, and a deposit of copper is plated over the lead. When the deposit has been built up to the proper extent, the frame will have made a complete circuit of the conveyor and the cathodes are then removed from the frame and new ones placed in position. The deposit is then stripped from each of these cathode blanks at a station indicated by the reference character 84. This stripping process, as described in the application above referred to, may be carried on simply by forcibly pulling the shells from the surface of the blanks, or else the cathodes may be heated either by the application of a flame, or by a submersion in a molten lead bath. This softens or melts the lead film between the cathode and the plate in the copper layer, and the latter may be easily removed. At the station 84 the cathodes are preferably washed so as to remove all traces of the electrolyte from the main cells 69 and 70, prior to the stripping, and the shells, now separated from the cathodes, are trimmed to proper size. In Fig. 11 a station 84 for washing, stripping, and trimming, has been shown opposite the end of each of the pairs of main electrolytic tanks, but if desired the cathodes with the deposit may be at once placed on a cross conveyor 85 and carried to a central stripping station. Whichever method is used, the shells are eventually placed on the conveyor 85 and transferred to another conveyor 86 where the final steps in the manufacture are carried on.

The conveyor 86 is preferably in the form illustrated in Fig. 19, in which there are a series of pairs of sections 87 and 88. The section 87 has a concavity 87' formed in its upper surface of a shape and form corresponding to the shape and form of the shell and as the conveyor moves along one shell is placed in each of the sections 87. The various final steps in the manufacture of the material are illustrated diagrammatically in Fig. 13, and as the shell is moved along in the conveyor section it passes a station 89, at which a quantity of the plastic material, as shown at 90 in Fig. 19, is placed in the shell. The conveyor continues its movement and the next step in the process is the insertion of the base 91. The bases may be cut to proper size and shape in advance of their insertion and as each shell comes by the station 92 a base is inserted in it, as shown in Fig. 20. This base is pressed down so that it is firmly held in position in the shell, and if desired the conveyor may pass through pressing rolls at this point to insure that the base is properly inserted in position. As shown in Fig. 19, the section 87 of the conveyor has a hollowed out portion 93 to receive the end of the base projecting beyond the edge of the shell, and with the shell in the concavity in this section when the base is placed in the hollowed out portion 93, the parts will be found to be properly assembled and held in place the plastic material sets.

Instead of using bases previously cut to proper shape for insertion in the shells, it is possible to cut these bases just before use. For this purpose a roll of base material of proper width is suspended above the conveyor and the web 94, drawn from this roll, passes between a pair of rolls 95, 96, the latter carrying a cutting blade 97. These rolls may be rotated at the proper point to cut a length of material just sufficient for a base, and the latter then drops down into the recess 93 in the section 87 of the conveyor. When the plastic material has hardened properly the conveyor moves it past a station designated as 98, where the surface of the base is dusted with talc so as to cover any excess plastic material which may run out. In the next station 99 the bases are turned over and laid on the flat section 88 of the conveyor, as shown in Fig. 21, and at the next station, 100, the cover plate is placed in position. This cover plate may be a piece of material of the same kind as the base, in which case the rear surface of the base and the rear extensions on metal will be coated with an adhesive material such as asphalt, or else a layer of asphalt of a thickness equivalent to the cover plate will be applied. When the layer of asphalt is used instead of the cover plate, some provision must be made for preventing this material from flowing over the edges of the base, and for this purpose each element will be placed in a frame which acts as a dam for the plastic material. Any other convenient method of applying the material, however, may be substituted for the purpose. Passing from the station 100, the conveyor moves the elements to a station 101, in which talc is applied so as to cover any sticky parts of the element, and at the next station, 102, the base is subjected to a coloring treatment, and beyond the coloring station the elements pass to a station 103 where excessive coloring material is washed off, and finally to a station 104, where the elements may be burnished so as to give desired surface finishes. It is to be understood, of course, that the various operations which take place at the different stations along the conveyor, are performed either by workmen or by suitable automatic apparatus devised for the purpose. The speed of the conveyor, however, is adjusted so that these operations may be carried on continuously without pause, and consequently from the time the shells are completed and placed on the conveyor 86 the finishing steps take place in a continuous succession.

Instead of securing the bases in place in the shells by placing a quantity of adhesive material in each shell, and then inserting a base in it thereafter, I have found it possible to make use of a different process in which a strip of the base of considerable width, for instance, 70″, has placed upon it masses of the adhesive compound in a fairly hard condition. These masses of the adhesive are placed in proper spaced relation and as the bases pass along on the conveyor as many shells as the strip will serve are placed over the adhesive masses and the bases and shells are then pressed together in the usual way. The edge of the strip will preferably be cut so that the enclosing edges of the shell may pass down over the edge portions of the base and after these shells have been secured in position the base is cut into sections and trimmed. This cutting and trimming operation, however, may take place at once after the shells have been secured to the base, or else it may be delayed until the shells have received the final burnishing treatment. In this way the handling of the articles is considerably reduced.

In the process for making shells just described, two conveyors and two sets of electrolytic tanks are used. One tank and its associated conveyor are used for carrying on the steps in the process by which the thin film of lead is placed on the cathode blanks, while the other electrolytic tanks are used for the deposition of the copper over the lead blank. In the lead cell the anodes employed are of lead, while copper anodes are used in the main electrolytic cell. By this process it is necessary to place the cathodes in the lead cell conveyor, then when the film of lead has been deposited, remove the cathodes from this conveyor and insert them in the conveyor associated with the main cells. Instead of using separate cells for the deposition of the two kinds of metal, it is possible to make use of an arrangement such as is illustrated in Fig. 14, in which one of the main cells is divided into two sections, one of which contains lead, the other copper electrolyte, and the same anodes are used in each cell. In the arrangement illustrated in the figure, the upper cell 69 has a portion partitioned off, forming a cell 105 which contains a lead electrolyte. The cathode blanks used are the same as before, but the anodes are made of lead. These anodes and cathodes are mounted in the conveyor 71, as before, and the conveyor first causes the immersion of the anodes and cathodes in the cell 105. In this cell the lead anodes go into solution and lead is deposited on the surface of the cathode blanks. As only a thin film is made use of, the section 105 of the main cell may be quite short in length. Passing out of this cell, the anodes and cathodes may be washed off so that remaining traces of the electrolyte are conserved. This washing may be carried on by passing the cathodes and anodes through a water screen running into a trough, or vat, between the sections 69 and 105. The conveyor next causes the immersion of the anodes and cathodes in the cell 69, in which the electrolyte is a copper sulphate solution. The lead anodes are insoluble in the free sulphuric acid in this cell. Consequently the anodes are not consumed either in this cell or in the cell 70 below it. However, current passes into the electrolyte from the anodes, and the copper is plated out from the electrolyte on the lead cathode, as before. In this type of cell it is necessary to provide the copper by continuously refreshing the electrolyte, since the anode itself does not add copper to the electrolyte, as is the case with copper anodes. When the carriage containing the anodes and cathodes has finally been returned after being passed through the cell 70, the cathodes are removed and stripped in the usual way. These cathodes may be then placed back in the frame at once, and the process continued. In this form of apparatus but a single conveyor is used, and the same anodes are used both in the lead and copper electrolytes. In the lead electrolyte the anodes are soluble, while in the copper electrolyte the anodes are insoluble, but serve the purpose of introducing the plating current.

I have found that in the manufacture of roofing elements according to this process, it is possible to effect considerable savings by employing anodes made of crude copper in the electrolytic cell, instead of those made of refined metal, as has heretofore been the practice, in plating operations. It will be understood that as the copper comes from the smelter it is first subjected to an electrolytic refining operation and the deposit is then melted and cast into the form of anodes used for commercial plating. During this electrolytic refining, the impurities in the metal, some of which are so valuable as to warrant recovery, are thrown down in the form of slimes. In the process herein described, I have found it possible to use anodes made of metal as it comes from the smelter and prior to its receiving any treatment whatever for refining purposes. The anodes used in the main electrolytic cells are cast at the smelter in appropriate form and in the electrolytic step which occurs in the cells 69 and 70, the process may be considered to be a combination of refining and plating. The valuable impurities which accumulate in the form of slimes may be periodically removed from the bottoms of these tanks from time to time, and may be treated in the customary way for recovering the valuable ingredients.

An economy in operation which is commensurate with those effected by the use of crude metal anodes in the electrolytic cell, may also be effected in case the lead anodes are used in the copper plating bath by refreshing the electrolyte with solutions formed by leaching ores containing soluble copper compounds. Such ores are well known and as the electrolyte diminishes in strength by reason of the deposition of the copper, it becomes stronger in free acid. Portions of this electrolyte may then be used for leaching the ores and the resulting solution is used directly in the cell as the electrolyte. In this process, as before, the impurities in the ore, some of which contain valuable ingredients, are thrown down in the cell in the form of slimes, and these slimes may be withdrawn from time to time in the usual way.

I have also found that in the lead tank slimes are usually produced containing silver, and the slimes from this tank are also preserved and the silver recovered by appropriate methods.

In Figs. 5, et seq., there are illustrated different features of the apparatus used in the production of the copperclad elements or of the shells, and in Figs. 9 and 10 there are shown plan and end views, respectively, of a carriage such as is used on the conveyors 71 and 81. These conveyors are in the form of a double link chain 106, provided with flanged wheels 107 at intervals. These wheels are arranged in pairs and they run on rails 108 appropriately placed. As shown in Fig. 8, the rails 108 are located on beams 109 on either side of the cell, near the upper edge, so that the frames carry the anodes and bases at the proper height with relation to the liquid level within the cell. These rails are arranged so as to carry the anodes and bases out over the ends of the cells and wheels 110 are placed at different points so as to cause the conveyor to move in the proper directions. As shown in Fig. 2, three such wheels are employed and the carriages on the conveyor have the same path of travel indicated by the broken lines. In Fig. 14 this path of travel is changed somewhat in order to cause the carriage to move out of the lead tank 105 and then down again into the copper tank 69.

Extending between the chains 106 at appropriate intervals and preferably disposed between a pair of wheels 107, which are placed close together, are shafts 111. Mounted on the shaft near either end thereof, is a bar 112, this bar being free to swing about the shaft so that it will always lie level, regardless of the path through which the conveyor may travel. Attached to each bar 112 and lying inwardly and downwardly therefrom, is a second bar 113, secured to which, on the inner face thereof, is a bar of insulating material, 113'. The bar of insulating material, which may be a strip of wood, extends slightly above the top edge of the bar 113. The anodes shown in Fig. 6 are especially intended for use in the production of the copperclad shingles of the three-unit size, and each anode consists of a main body or plate 114, from which extend upward tongues corresponding in position generally to the position of the tongues 44 to be formed on the shingle. These tongues are somewhat wider than the tongues 44, and also of somewhat greater length. The outer tongues are provided with rods 116 which are secured to a cross bar 117, and this cross bar 117 rests upon the bars 113' when the anode is in position. In order to hold the bases in proper spaced relation to the anodes, a spacer or separator member is used, shown in Fig. 7. This spacer or separator member is made in two parts, each of which is in turn subdivided. The spacer is made of insulating material and serves to mask all portions of the anode except those directly opposed to the surface on which the metal is to be applied to the element. As will presently be described, these spacers or separators also serve to stop off those portions of the base on which no deposit is to occur. In order to produce the deposit of the shape shown in Fig. 23, each separator is made with two narrow end portions 118, and two wider central portions 119. Between the adjacent edges of the members 118 and 119 there is exposed a part of the anode corresponding in width to the width of the tongue 44 on the element, and the members 119 are spaced an equal distance. The sections of the separator member made of any suitable insulating material such as wood, suitably impregnated so as not to be affected by the electrolyte, are suspended from the rod 117 by any convenient means, such, for instance, as metal strips 120, secured to sections of the separator member on either side of the anode. These metal strips 120 are secured at either end to one of the sections 118 or 119 of the spacer. These sections, therefore, rest in proper relation to the anode. As shown in Fig. 10, a pair of bases 121 are to be supported in the frames back to back, with their conducting coatings facing adjacent anodes. Some means must be provided, therefore, for removing the plating current from these conducting coatings and for this purpose contact members or plates illustrated in Fig. 4 are used. These plates are made of a conducting material, preferably of a metal which is insoluble in the electrolyte, such, for instance, as lead, and these pieces of metal, 122, are folded back so as to provide portions 123 which lie substantially parallel on either outer face of the separators 119. In their lower edges the plates have cut-outs 124, corresponding closely to the shape of the tongues which is to be plated on the base. At its upper end the contact plate is secured to a bar 125.

The frame or carriage illustrated in Fig. 9 is provided with a fixed abutment member 126, at one end, which extends between the bars 112. This abutment member has spaced depending arms 127 which are firmly secured in position and held against movement. Between the other ends of the bars 112 is a rod 128, which at one end carries a segment 129, which is engaged by the thread 130 on a worm shaft 131 mounted in appropriate bearings on one of the rods 112. Depending arms 132 extend downwardly from the rod 128, these arms being connected by a rod 133 at their lower ends. The purpose of the rocking rod 128 with its bar 133 is to provide a means for holding the bases in place between the anode assemblies, and by turning the squared end of the shaft 131 the rod 128 may be rocked so as to swing the rod 133 in and out with reference to the rod 128.

As shown in Fig. 10 each anode assembly consists of a pair of separators on either face of the contact plate, one portion of which lies over the outer face of each of the separators. This contact plate is to withdraw plating current from the base, and consequently must be insulated electrically from the anode. For this purpose a strip of insulating material 134 is placed on top of the rod 117 after the separators have been hung on this rod in appropriate relation to anode. The contact member is then slipped over the anode and separators and the bar 125 is insulated by the strip 134 from the bar 117. By lifting the bar 117 the whole anode assembly may be handled as a unit. A series of such anode assemblies are placed in position on the bar 113' of the carriage, and between each pair of assemblies is placed a pair of bases 121 back to back, with their conducting coatings facing the anode. When the bases are in this position only those portions of the base which are to be plated are exposed, as shown in Fig. 4, and the contact plates overlie the conducting coating on the base to a sufficient extent to permit current to be withdrawn therefrom. When a pair of elements has been placed in proper position between each pair of anode assemblies, as shown in Fig. 10, the shaft 131 is turned so as to swing the pressure rod 133 against the adjacent assembly. This forces the series of assemblies together against the abutment 127, and the pairs of bases are now gripped in position and cannot be dislodged. When the anodes and bases have thus been placed in the carriage, as the conveyor moves the anode assemblies and the bases are inserted in the solution as illustrated in Fig. 8, and the plating operation takes place. In order to establish appropriate electrical connections in the cell the bar 117 which is connected by the rods 116 to the anode, carries a brush 135 at one end, this brush bearing on a positive bus bar 136. The current then flows through the brush, the bar 117, the rods 116 to the anode, thence across the intervening solution to the conducting surface of the base, to the contact member 123, thence to the bar 125, which carries a brush 137 at its outer end, bearing upon a negative bus bar 138 mounted on the opposite side of the cell. With this arrangement it will be seen that each anode with a pair of bases, provides a circuit through the electrolyte between the bus bars, and all these circuits are in parallel. While electrical connections, as described, have been found satisfactory for the purpose, it is clear that various other electrical circuits may be established. For instance, it may be desirable to connect the group of anodes in series, or to establish some other circuit. Such other circuits may readily be set up by appropriately connecting the bars 117 of the anodes and the bars 125 of the cathode contact members.

The use of the conveyor apparatus for the production of shells is, in general, similar to that previously described. The cathode blanks for the purpose are shown in Fig. 15, and these cathode blanks have a surface which conforms to the contour of the finished element, so that the shells produced thereon will have a similar contour. The blanks are made in two similar parts 139 and 140, separated by an insulating layer 141. These blanks are so formed as to produce the transverse extension 142 and the tabs 143 and 144 and the blanks are suspended from a bar 145 by hooks 146. This bar carries a brush 147 at one end. The purpose of making the cathode blanks in two halves, separated by insulating material is to insure that the metal will not plate completely around the lower end of the blank so as to make the two shells in one continuous piece. As shown, the blanks are formed so as to produce flat portions 148, extending beyond the lower splay edges of the shells, and between the extreme edges of these extensions the insulating material is inclined outwardly as at 149 so as to secure the maximum spacing. If the two halves of the blank were not spaced by a considerable extent at this point, the deposit might build up in the form of trees so as to spread from one edge to the other, and this would make it difficult to strip the two halves and would also necessitate considerable trimming. The flat portions 148 which extend beyond the lower edges of the shell provide a part of the shell which may be turned back under the forward edge of the base, as shown in Fig. 29, thus serving as an additional means of holding the base firmly in position.

The anode used in the production of the shells is shown in Fig. 17. This anode 150, in general, has the same shape as the deposit to be made on the cathode blanks and the tongues 151 are secured, as for instance, by means of bolts 152, to a cross bar 153 which carries a brush 154 at one end. In producing the shells, the anodes and cathodes are not placed closely adjacent each other, but are supported on the bar 113' of insulating material in any convenient spaced location. For this purpose these bars will be notched so as to receive the ends of the bars 145 and 153, and it is not necessary to make use of any clamping device, as shown in Fig. 10. The construction of the frames for use in the lead cells, as shown in Fig. 12, is substantially the same as that just described.

While the apparatus which I have described and illustrated is by no means the only apparatus which is useful for practicing the process of this invention, I have found it to offer numerous advantages in the commercial production of the copperclad elements and shells. In the form illustrated, the different parts have been designed for the production of multiple unit shingles, more particularly of the three-unit type. If four-unit shingles were to be made, the tanks would be of somewhat greater width and the frames would also be given appropriate dimensions for the purpose. In the production of single unit shingles it is preferable to use a conveyor construction somewhat similar to that shown, but so arranged that the individual shingles may be supported three or more in a row across the frame. This permits the production of the single shingles to be carried on as rapidly as the production of a quantity of the three-unit shingles which would cover the same area. The cathode blanks illustrated in Fig. 15 are for the production of shells for use in three-unit shingles, but these do not differ, except in dimensions, from those used in single unit shingles. While the cathode blanks illustrated in the drawings have a convex portion so that the shells deposited thereon are concave to receive the bases, it will be understood that the shells could be deposited substantially in the form of flat sheets and then given the concavities by a later stamping operation. In some instances this latter treatment might be preferable because of a greater ease in stripping.

By the use of the carriages or frames in which the group of anodes and cathodes are supported and moved through the electrolyte, it is possible to maintain the anodes and cathodes in fixed relation during the deposition of the metal, and this improves the quality of the deposit and makes it possible to insure that the deposit on all of the elements will be uniform. In other words, it permits a more exact control of the electrodeposition. Also, as the anodes are consumed they must be replaced from time to time, and by moving the anodes with the cathodes they pass by the station where the cathodes are removed and replaced, so that whenever new anodes must be put in position this is a simple matter which does not involve any considerable delay. If stationary anodes were used it would be necessary to distribute them along the length of the tanks and as the anodes went into solution they would have to be replaced from time to time. It would be difficult to do this without interfering with the carrying on of the process, and would require continuous inspection. Also, it would be inconvenient to raise the anodes at different points along the tank and replace them by new anodes, and additional apparatus would probably be necessary for the purpose. In the present construction, however, by causing the anodes to be carried along with the cathodes the workman can readily see when replacement is necessary and this can be done rapidly at the station where the cathodes are changed, since convenient hoisting apparatus may be provided at this point, if necessary.

While the process and apparatus which I have described are particularly adapted for the production of roofing elements of the copperclad and shell types, thin metal sheets or various other metal articles produced electrolytically, may be manufactured. For such purpose the cathode blanks would have a surface appropriate to the kind of material to be produced, and these cathodes, as before, would be given the lead film prior to their introduction into the electrolytic tanks. Upon the completion of the plating of desired thickness, the deposit would be stripped off, as before, and could then be used alone or in combination with a base, depending, of course, on the kind of article being manufactured. I have found in the production of roofing elements, for instance, that in some instances it may be desirable to make the shell substantially in the form of sheets and then produce the concave shape by suitable pressing apparatus. The deposition of the shells in the sheet form considerably facilitates the stripping, and may be desirable where the surface of the metal is to have a roughened appearance.

Various other adaptations of the principles of the invention will readily occur to those skilled in the art, but the invention is of particular utility in the production of articles in which a non-metallic base of some sort is given a metal plating, or in which a metallic protective layer or casing is to be applied to a base. This is especially true when the articles are produced in large quantities and in a uniform size and quality. The apparatus by which the process is carried on is extremely simple and its operation does not require large amounts of power, nor is any considerable amount of manual labor necessary, although the number of workmen employed will, to a large extent, depend on the type of product which is being manufactured. However, the apparatus is conveniently arranged so that the various manual operations may be performed in a highly efficient manner. The process is under complete control at all times, and this makes it possible to produce uniform products in any desired grade without substantial variation. This production may be carried on for indefinite periods, without interruption, since there are few parts of the apparatus which are subject to breakage or wear, and the materials which are used in the final product may be continuously supplied as the apparatus is being operated.

I claim:—

1. A process of electrodeposition which comprises moving an anode and a cathode simultaneously through a cell containing an electrolyte, and during such movement, maintaining a connection between the anode and the positive side of a source of electrical energy and a connection between the cathode and the negative side of the source of electrical energy.

2. A process of electrodeposition which comprises moving an anode and a cathode simultaneously through a cell containing an electrolyte, while maintaining the anode and cathode in substantially fixed relation and, during such movement, maintaining a connection between the anode and the positive side of a source of electrical energy and a connection between the cathode and the negative side of the source of electrical energy.

3. A process of electrodeposition which comprises moving an anode and a cathode simultaneously through a closed path, passing the anode and cathode, during at least a part of said movement, through a cell containing an electrolyte, and, during the movement of the anode and cathode, through the cell maintaining a connection between the anode and the positive side of a source of electrical energy and a connection between the cathode and the negative side of the source of electrical energy.

4. A process of electrodeposition which comprises supporting an anode and a cathode in a carrier, moving the carrier through a closed path, during a part at least of such circuit, passing the anode and cathode through a cell containing an electrolyte, and maintaining a connection between the moving anode and the positive side of a source of electrical energy, and a connection between the moving cathode and the negative side of the source of energy during their passage through the cell.

5. A process of electrodeposition which comprises supporting an anode and a cathode in a carrier in substantially fixed relation, moving the carrier through a cell containing an electrolyte in such manner as to cause the anode and cathode to be immersed in the electrolyte, and during the immersion introducing plating current into the cell through the anode and withdrawing it through the cathode.

6. A process of electrodeposition which comprises moving a plurality of anodes and cathodes, arranged alternately in a series, through a cell containing an electrolyte, and, during such movement through the cell, leading plating current into the cell through the anodes and withdrawing it through the cathodes.

7. A process of electrodeposition which comprises mounting a plurality of anodes and cathodes in an alternating series on a carrier, the anodes and cathodes being maintained in substantially fixed relation therein, moving the carrier through a cell containing an electrolyte in such manner as to cause the anodes and cathodes to be immersed in the electrolyte, and, during the immersion, introducing plating current into the cell through the anodes and withdrawing it through the cathodes.

8. A process of electrodeposition which comprises continuously treating cathode elements to prepare them for receiving an electrolytic deposit, delivering the treated cathode elements to an electrolytic cell, simultaneously moving anodes and treated cathode elements through the cell in pairs, and, during this movement, maintaining a connection between the anodes and the positive side of a source of electrical energy, and a connection between the cathode elements and the negative side of the source of energy.

9. A process of electrodeposition which comprises continuously treating cathode elements to prepare them for receiving an electrolytic deposit, delivering the treated cathode elements to an electrolytic cell, mounting a plurality of anodes and treated cathode elements in an alternating series in a carrier, moving the carrier through the cell in such manner as to cause the immersion of the electrode elements in the electrolyte contained in the cell, during such movement introducing plating current into the cell through the anodes and withdrawing it through the cathode elements, and periodically replacing the cathode elements in the carrier.

10. A process of electrodeposition which comprises moving an anode and a cathode simultaneously through a cell containing an electrolyte, during this movement, introducing plating current into the cell through the anode and withdrawing it through the cathode to produce a deposit upon the cathode, removing the cathode from the cell when the deposit thereon has reached the desired thickness, and stripping the deposit from the cathode.

11. A process of electrodeposition which comprises continuously preparing cathode elements to receive an electrolytic deposit, moving an anode and a treated cathode element simultaneously through a cell containing an electrolyte, during such movement introducing plating current into the cell through the anode and withdrawing it through the cathode element, removing the cathode element from the cell when the deposit has reached the desired thickness, and subjecting the cathode element and deposit to heat to facilitate the stripping of the deposit from the cathode element.

12. A process of electrodeposition, which comprises moving a plurality of cathodes and lead anodes through a cell containing a lead electrolyte and therein depositing a thin film of lead on the cathode, and then moving the anodes and the coated cathodes through a cell containing a copper electrolyte, and depositing a coating of copper on the cathodes over the lead film.

13. A process of electrodeposition which comprises moving a plurality of anodes and cathodes through a cell containing a lead electrolyte and therein depositing a thin film of lead on the cathodes, moving the cathodes and a plurality of copper anodes through a cell containing a copper electrolyte and therein depositing a coating of copper over the film of lead, removing the cathodes, and stripping the deposited copper therefrom when the coating has reached the desired thickness.

14. A process of electrodeposition which comprises supporting an anode and cathode in parallel relation but spaced by an insulating member, subjecting the anode and cathode to pressure to maintain their relation, moving the anode and cathode through an electrolytic cell and introducing plating current into the cell through the anode and withdrawing it through the cathode.

15. A process of electrodeposition, which comprises mounting a plurality of cathodes and lead anodes in a carrier, moving the carrier through a cell containing a lead electrolyte and therein depositing a thin film of lead on the cathodes, mounting a plurality of lead-coated cathodes and copper anodes in a second carrier, moving this carrier through a cell containing a copper electrolyte, depositing a layer of copper on the cathodes, and, when the copper has reached the desired thickness, removing the cathodes from the carrier and stripping the deposits therefrom.

16. A process of electrodeposition which comprises arranging a plurality of anodes and cathodes in alternate relation, holding the cathodes in position between the anodes by pressure applied to the end elements of the group while maintaining the anodes and cathodes electrically insulated from each other, moving the group of anodes and cathodes through a cell containing an electrolyte, and producing a deposit on the cathodes by introducing a plating current into the cell through the anodes and withdrawing it through the cathodes.

17. A process of manufacturing roofing elements electrolytically, which comprises arranging an anode and a cathode in fixed relation on a conveyor, the cathode having a conducting face opposed to the anode, holding the anode and cathode in substantially fixed relation on the conveyor while electrically insulating them from each other, moving the conveyor through a cell containing an electrolyte, and, during such movement, introducing plating current into the cell through the anode and withdrawing it through the cathode.

18. A process for manufacturing roofing elements electrolytically, which comprises continuously treating cathode elements to prepare them for receiving an electrolytic deposit, delivering the treated cathode elements to an electrolytic cell, mounting a plurality of anodes and treated cathode elements in an alternating series in a carrier, the anodes and cathode elements being maintained in substantially fixed parallel relation, moving the carrier through the cell in such manner as to cause the immersion of the electrode elements in the electrolyte contained in the cell, introducing plating current into the cell through the anodes, and withdrawing it through the cathode elements to produce a deposit upon the cathode elements, removing the cathode elements from the cell when the deposit thereon has reached the desired thickness, stripping the deposited metal from the cathode elements, and affixing each deposit to a base.

19. A process of manufacturing roofing elements electrolytically, which comprises continuously treating cathode elements to prepare them for receiving an electrolytic deposit, delivering the treated cathode elements to an electrolytic cell, mounting a plurality of anodes and treated cathode elements in an alternating series in a carrier, the anodes and cathode elements being maintained in substantially fixed parallel relation, moving the carrier through the cell in such manner as to cause the immersion of the electrode elements in the electrolyte contained in the cell, introducing plating current into the cell through the anodes and withdrawing it through the cathode elements to produce a deposit upon the cathode elements, removing the cathode elements from the cell when the deposit thereon has reached the desired thickness, stripping the deposited metal from the cathode elements, applying an adhesive material to one face of each stripped deposit, and affixing a base to each deposit.

20. A process of manufacturing roofing elements electrolytically, which comprises mounting a plurality of anodes and cathodes in a carrier in alternate relation, each cathode having a shape corresponding to the shape of the roofing element to be produced, moving the loaded carrier through an electrolytic cell containing an electrolyte, while introducing plating current into the cell through the anodes and withdrawing it through the cathodes, stripping the deposited metal from the cathodes when the deposit has reached the desired thickness, and affixing non-metallic bases to the stripped deposits.

21. A process of manufacturing roofing elements electrolytically, which comprises applying to the surface of a cathode element having a shape corresponding to the shape of a part of the finished roofing element, a conducting coating, moving a plurality of anodes and treated cathode elements through an electrolytic cell while introducing plating current into the cell through the anodes and withdrawing it through the cathode elements to deposit a metal over the conducting coating on the cathode elements, stripping the deposited metal from the cathode elements when the deposit has reached the desired thickness, and affixing non-metallic bases to the stripped deposits.

22. A process of manufacturing roofing elements electrolytically, which comprises applying to the surface of a cathode element a thin film of a metal, moving a plurality of anodes and treated cathode elements through an electrolytic cell and therein depositing a layer of a different metal over the metallic film on the cathode elements, removing the cathode elements from the cell, stripping the deposits therefrom when the latter have reached the desired thickness, applying an adhesive material to one surface of the stripped deposits, and affixing non-metallic bases to the deposits by means of the adhesive material.

23. A process of manufacturing roofing elements electrolytically, which comprises moving a plurality of anodes and cathodes through an electrolytic cell and causing a layer of metal to be deposited on the cathodes, removing the cathodes from the cell and stripping the deposits therefrom, placing the deposits on a moving conveyor, and affixing to each deposit a non-metallic base.

24. Apparatus for electrodeposition, which comprises the combination of an electrolytic cell, conveying means adjacent the cell, supporting means on the conveying means, an anode and a cathode on the supporting means, and means for introducing plating current into the cell through the anode and withdrawing it through the cathode.

25. Apparatus for electrodeposition, which comprises the combination of an electrolytic cell, conveying means mounted adjacent the cell, supporting means carried by the conveying means, an anode and a cathode mounted in substantially fixed relation on the supporting means, and means for introducing plating current into the cell through the anode and withdrawing it through the cathode.

26. Apparatus for electrodeposition, which comprises the combination of an electrolytic cell, a conveyor movable along the cell, supporting means on the conveyor, an anode and a cathode carried on the supporting means, positive and negative bus bars mounted adjacent the cell, and contact members connected with the anode and cathode for making contact with the positive and negative bus bars respectively.

27. Apparatus for electrodeposition, which comprises the combination of an electrolytic cell, a conveyor movable along the cell, a frame supported on the conveyor, an anode and a cathode supported on the frame, a positive and negative bus bar mounted adjacent the cell, and means for electrically connecting the anode and cathode to the positive and negative bus bars respectively.

28. Apparatus for electrodeposition, which comprises the combination of an electrolytic cell, a conveyor mounted along the cell, a pair of anodes supported on the conveyor, a cathode mounted on the conveyor between the anodes, the opposed faces of the cathode being electrically conducting, and means for introducing plating current into the cell through the anodes and withdrawing it through the conducting faces of the cathode.

29. Apparatus for electrodeposition, which comprises the combination of a cell containing an electrolyte, a conveyor movable along the cell, an anode supported on the conveyor, an insulating spacing member supported on one face of the anode, a cathode disposed adjacent the anode, means for pressing the anode and cathode together to hold the two in fixed relation but insulated from each other by the spacing member, and means for introducing plating current into the cell through the anode and withdrawing it through the cathode.

30. Apparatus for electrodeposition, which comprises the combination of a cell containing an electrolyte, a conveyor movable along the cell, an anode supported on the conveyor, a cathode supported on the conveyor, this cathode having a thin film of conducting material on a surface immersed in the electrolyte, a positive bus bar extending along one side of the cell, a negative bus bar extending along the other side of the cell, and contact means connected with the anode and the conducting coating on the cathode for establishing electrical connections with the positive and negative bus bars respectively.

31. Apparatus for electrodeposition, which comprises the combination of a cell containing an electrolyte, a conveyor movable along the cell, a frame supported on the conveyor and having a pair of insulated frame members, an anode and a cathode supported on the said frame members, and means for introducing plating current into the cell through the anode and withdrawing it through the cathode.

32. Apparatus for electrodeposition, which comprises the combination of a cell containing an electrolyte, a conveyor movable along the cell, a frame mounted on the conveyor and having supporting members, an anode depending from the supporting members, a cathode depending from the supporting members, a positive bus bar mounted adjacent the cell, a negative bus bar mounted adjacent the cell, and contacting means connected with the bar of the anode and cathode for contacting respectively with the positive and negative bus bars.

33. Apparatus for electrodeposition, which comprises the combination of a cell containing an electrolyte, a conveyor movable along the cell, a frame carried by the conveyor, a stop mounted on the frame, an anode supported on the frame carrying an insulated spacing member, a cathode disposed adjacent the spacing member, means on the frame for forcing the anode and cathode toward the stop to cause the cathode to be held in fixed relation to the anode against the spacing member, and means for introducing plating current into the cell through the anodes and withdrawing it through the cathodes.

34. Apparatus for electrodeposition, which comprises the combination of a pair of electrolytic cells, a conveyor adjacent the cells and having stretches passing adjacent the cells, an anode and a cathode carried by the conveyor and movable by the latter into and out of the cells in succession, and means for introducing plating current into the cells through the anode and withdrawing it through the cathode.

35. Apparatus for electrodeposition, which comprises the combination of a pair of electrolytic cells, one of the cells having two compartments, a conveyor adjacent the cells for moving electrodes through each of the cells including both of said compartments, an anode and a cathode mounted on the conveyor, and means for introducing plating current into the cells through the anode and withdrawing it through the cathode.

36. Apparatus for electrodeposition, which comprises the combination of an electrolytic cell, a conveyor adjacent the cell, means for delivering cathode elements to the conveyor, means on the conveyor for supporting a plurality of anodes and cathode elements, and means for introducing plating current into the cell through the anodes and withdrawing it through the cathode elements.

37. Apparatus for electrodeposition, which comprises the combination of a cell containing an electrolyte, a conveyor movable along the cell, a carriage on the conveyor, a pair of anodes supported by the carriage, a cathode between the anodes, insulating members between the faces of the cathode and the adjacent anodes, means on the carriage for pressing the anodes and cathode together to maintain these parts in substantially fixed relation but insulated from each other, and means for introducing plating current into the cell through the anodes and withdrawing it through the cathodes.

38. In apparatus for electrodeposition, the combination with an electrolytic cell of a conveyor, a pair of anodes mounted on the conveyor, a spacer member mounted on each anode, a contact member mounted on each anode but electrically insulated therefrom, a cathode supported between the anodes and in electrical connection with the contact members, and means for introducing plating current into the cell through the anodes and withdrawing it through the cathodes and contact members.

39. In apparatus for electrodeposition, the combination with an electrolytic cell of a conveyor, a pair of anodes mounted on the conveyor, an insulating spacer member mounted on each anode, a contact member carried by each anode, this contact member being insulated from the anode, a cathode disposed between the pair of anodes, means for pressing the anodes and cathode together to cause the anodes to grip the cathode with the contact member in contact therewith, and means for introducing plating current into the cell through the anode and withdrawing it through the cathode and contact member.

40. In electrolytic apparatus, the combination with an electrolytic cell of a conveyor carrying a plurality of frames, each frame comprising supporting members for carrying electrodes, a stop carried by the frame, and means for pressing the supported electrodes against the stop.

41. In apparatus for electrodeposition, the combination with an electrolytic cell, of a conveyor provided with a plurality of frames, each frame comprising supporting members having recesses for receiving electrodes and maintaining them in spaced relation.

42. In apparatus for electrodeposition, the combination with a frame having supporting members, of an anode having a bar resting on the supporting members, a cathode also having a bar resting on the supporting members, and contact members connected to the anode and the cathode.

43. In apparatus for electrodeposition, the combination of a frame having supporting members, an anode having a bar at its upper end resting on the supporting members, a cathode also having a bar at its upper end resting on the supporting members, and means on the supporting members for maintaining the anode and cathode in spaced relation.

44. In apparatus for electrodeposition, the combination with an electrolytic cell having positive and negative bus bars mounted thereon, of a movable frame, and an anode and a cathode supported in the frame and having contact members making contact with the positive and negative bus bars respectively.

45. In apparatus for electrodeposition, the combination with an electrolytic cell having positive and negative bus bars mounted thereon, of a frame movable through the cell and having supporting members, an anode having a bar resting on the supporting members, a cathode having a bar resting on the supporting members, and contact members carried by the bars of the anode and cathode for making contact with the positive and negative bus bars respectively.

46. In apparatus for electrodeposition, the combination with an electrolytic cell, of a frame movable therealong and having supporting members, a plurality of anodes and cathodes mounted on the supporting members by means of bars, means on the supporting members for maintaining the anodes and cathodes in spaced relation, and contact members carried by the bars of the anodes and cathodes for making contact with the positive and negative bus bars respectively.

47. In apparatus for electrodeposition, the combination with an electrolytic cell having positive and negative bus bars, of a frame movable along the cell, a pair of anodes mounted on the frame, each anode having a contact member mounted on it and insulated from it, a cathode disposed between the anodes and making an electrical connection with the contact members, and electrical connections between the anodes and the positive bus bar and between the cathode and the negative bus bar through the contact members.

48. In apparatus for electrodeposition, the combination with an electrolytic cell, of a frame movable therealong and having supporting members, a pair of anode assemblies mounted on the supporting members, each assembly comprising an anode, a spacing member mounted on the anode, a contact member mounted on the anode and insulated therefrom, a cathode disposed between the anodes, means for pressing the anodes toward each other to cause the cathode to be gripped therebetween, with the contact members in contact with the cathode, and means for connecting the anodes to the positive side of a source of electrical energy and for connecting the cathode to the negative side of the source of energy.

49. In apparatus for electrodeposition, the combination with an electrolytic cell, of a frame movable therealong and having supporting members, a pair of anode assemblies mounted on the supporting members, this assembly comprising an anode, an insulating spacing member having portions extending beyond either face of the anode, a contact member having portions lying on the outer faces of the spacing members, these contact members being insulated from the anode, a cathode disposed between the pair of anodes, means for pressing the anodes together to cause the cathode to be gripped therebetween with the contact members in contact with the cathode, a positive and negative bus bar adjacent the cell, means electrically connected with the anodes for making a connection with the positive bus bar, and means for connecting the contact members with the negative bus bar to establish electrical connections between this bus bar and the cathode.

50. In apparatus for electrodeposition, the combination with an electrolytic cell, of a frame movable therealong and having supporting members, a pair of anodes having bars resting on the supporting members, insulating spacing members mounted on either face of each anode, a contact member having portions lying on either face of each spacing member and having a bar resting on but insulated from the bar of the anode, a cathode disposed between the pair of anodes, means for pressing the anodes toward each other to grip the cathode therebetween with its surface in contact with the contact members, positive and negative bus bars mounted adjacent the cell, a contact member connected with the bar of the anode for making contact with the positive bus bar, and a contact member connected with the bar of the first contact member for making contact with the negative bus bar.

51. In apparatus for electrodeposition, an anode having a shape corresponding to the shape of the deposit to be made, a bar secured to the anode for supporting the same, and a contact member carried by the anode for conducting plating current to the anode.

52. In apparatus for electrodeposition, an anode assembly comprising a soluble anode having a shape corresponding to the shape of the deposit to be made and having a bar for supporting the same, an insulating spacing member mounted on the anode and having portions extending beyond either face of the anode, this spacing member having a shape corresponding to the edge contour of the deposit to be made, a contact member mounted on the anode and having portions on the outer face of each spacing member, a terminal member connected with the anode, and a terminal member connected with the contact member.

53. In apparatus for electrodeposition, an anode assembly comprising a soluble anode and a supporting bar, an insulated spacing member mounted on the anode and having portions extending over either face of the latter, this spacing member serving to expose an area of the anode corresponding to the shape of an area to be plated on a cathode, a main contact member having portions disposed on the outer faces of the spacing member, this contact member being insulated from the anode, a contact member carried by the anode and extending beyond one edge thereof, and a contact member electrically connected with the main contact member.

54. In apparatus for electrodeposition, an anode comprising a body portion and a supporting bar secured thereto.

55. In apparatus for electrodeposition, an anode having a plate-like body portion, a supporting bar secured to the body portion, and a contact member for leading current to the body portion.

56. In apparatus for electrodeposition, an anode comprising a plate-like body portion having a shape corresponding to the shape of the deposit to be made, a supporting bar secured to the upper edge of the body portion, and a contact member secured to the supporting bar.

57. In apparatus for electrodeposition, a spacing member comprising a pair of body portions connected at their upper edges and having their lower edge shaped to correspond to the edge contour of a deposit to be made.

58. In apparatus for electrodeposition, an anode assembly comprising the combination of an anode having a plate-like body portion and a supporting bar secured thereto, a spacing member having two body portions connected together, these body portions lying on opposite surfaces of the anode with the connecting portion resting on the anode, and a contact member having body portions resting on the outer surfaces of the body portions of the spacer and provided with a bar resting on the supporting bar of the anode, this bar being insulated from the supporting bar of the anode.

59. In apparatus for electrodeposition, an anode assembly comprising an anode having a plate-like body portion, a supporting bar, and a contact member, a spacer member having a pair of body portions and a connection between them, the latter resting on the anode to hold the body portions on either face of the latter, a main contact member having connected body portions resting on the outer faces of the body portion of the spacer, and a contact member electrically connected with the main contact member and extending beyond the end thereof.

60. In apparatus for electrodeposition, the combination with an electrolytic cell having rails mounted on either side thereof, of a pair of flexible conveyor members, each member having a plurality of wheels running on the rails, a plurality of shafts secured to the members adjacent the wheels, and frames swingingly mounted on the shafts.

61. In apparatus for electrodeposition, the combination of an electrolytic cell having rails extending therealong, a conveyor provided with a plurality of wheels running on the rails, supporting cross shafts carried by the conveyor, and a frame swingingly mounted on each shaft and having insulated bars for supporting anodes and cathodes.

62. In apparatus for electrodeposition, a cathode comprising a pair of body portions separated by an insulating layer, a supporting bar, and a contact member.

63. In apparatus for electrodeposition, a cathode comprising the combination of a pair of body portions, a layer of insulating material between the body portions, this layer being exposed at its edges throughout all portions of the cathode normally to be immersed in the electrolyte, a supporting bar electrically connected to the body members, and a contact member carried by the supporting bar.

64. In apparatus for electrodeposition, a cathode comprising the combination of a body portion having a predetermined shape corresponding to the shape of the article to which the deposit is to be applied, this body portion being made of a conducting material, a thin film of metal different from the metal which is to be deposited on the cathode applied to the surface thereof, a supporting bar, and contact means electrically connected with the body portion of the cathode.

65. In apparatus for electrodeposition, a cathode comprising the combination of a body portion having a predetermined shape corresponding to the shape of the article to which the deposit is to be applied, this body portion being made of a conducting material, a thin film of metal different from the metal which is to be deposited on the cathode applied to the surface thereof, a supporting bar, and a contact member connected to the supporting bar.

66. A process of electrodeposition, which comprises simultaneously moving an anode and a cathode side by side through a cell containing an electrolyte and, during such movement, maintaining a connection between the anode and the positive side of a source of electrical energy and a connection between the cathode and the negative side of the source of energy.

67. A process of electrodeposition, which comprises simultaneously moving a plate-like anode and a plate-like cathode side by side through a cell with the plane surfaces of the anode and cathode facing each other and, during such movement, maintaining a connection between the anode and the positive side of a source of electrical energy and a connection between the cathode and the negative side of the source of electrical energy.

68. A process of electrodeposition, which comprises mounting an anode and a cathode side by side in a carrier with similar surfaces of the anode and cathode facing each other, moving the carrier through a cell containing an electrolyte and, in such movement, immersing the anode and cathode in the electrolyte, and, during the immersion, introducing plating current into the cell through the anode and withdrawing it through the cathode.

69. Apparatus for electrodeposition, which comprises the combination of an electrolytic cell, a conveyor movable along the cell, supporting means on the conveyor, a pair of anodes carried by the supporting means, means for holding a cathode between the anodes, positive and negative bus bars mounted adjacent the cell, and contact members connected with the anodes and cathode for making contact with the positive and negative bus bars respectively.

70. A method for producing roofing elements consisting of a non-metallic base and a layer of metal applied to one face of the base, which comprises applying an electro-conductive layer to one surface of each of a pair of bases, placing these bases back to back with their conductive layers outermost, placing the bases in this relation between a pair of anodes, moving the anodes and bases through an electrolytic cell, passing a plating current into the cell through the anodes, and withdrawing it through the conductive surfaces of the bases.

71. Apparatus for electrodeposition which comprises the combination of an electrolytic cell, a conveyor movable along the cell, supporting means on the conveyor, an anode and a cathode carried side by side on the supporting means, with similar surfaces of the anode and cathode facing each other, positive and negative bus bars mounted adjacent the cell, and members connected with the anode and cathode for making electrical connection with the positive and negative bus bars respectively.

In testimony whereof I affix my signature.

THOMAS ROBINSON.